United States Patent
Karasawa et al.

(10) Patent No.: US 11,025,018 B2
(45) Date of Patent: Jun. 1, 2021

(54) CHARGING INLET

(71) Applicant: Sumitomo Wiring Systems, Ltd., Yokkaichi (JP)

(72) Inventors: Masahiro Karasawa, Toyota (JP); Hironobu Hashimoto, Toyota (JP); Toshiyuki Matsuda, Yokkaichi (JP)

(73) Assignee: Sumitomo Wiring Systems, Ltd.

( * ) Notice: Subject to any disclaimer, the term of this patent is extended or adjusted under 35 U.S.C. 154(b) by 0 days.

(21) Appl. No.: 16/751,527

(22) Filed: Jan. 24, 2020

(65) Prior Publication Data
US 2020/0244016 A1  Jul. 30, 2020

(30) Foreign Application Priority Data
Jan. 25, 2019  (JP) .............................. JP2019-011232

(51) Int. Cl.
*H01R 13/74* (2006.01)
*B60L 53/16* (2019.01)
*H02J 7/00* (2006.01)

(52) U.S. Cl.
CPC ............ *H01R 13/748* (2013.01); *B60L 53/16* (2019.02); *H02J 7/0045* (2013.01); *H01R 2201/26* (2013.01)

(58) Field of Classification Search
CPC ..... H02J 7/0045; B60L 53/16; H01R 2201/26
See application file for complete search history.

(56) References Cited

U.S. PATENT DOCUMENTS

| | | | | |
|---|---|---|---|---|
| 8,662,910 | B2 * | 3/2014 | Ichio | H01R 43/005 439/206 |
| 8,740,632 | B2 * | 6/2014 | Osawa | H01R 13/50 439/76.2 |
| 9,463,702 | B2 * | 10/2016 | Fukushima | H01R 13/502 |
| 9,478,921 | B2 * | 10/2016 | Osawa | H01R 13/42 |
| 9,505,313 | B2 * | 11/2016 | Shimizu | H01R 13/436 |
| 9,533,586 | B2 * | 1/2017 | Kahara | B60L 53/16 |
| 9,610,850 | B2 * | 4/2017 | Sasaki | B60L 53/16 |
| 9,755,367 | B2 * | 9/2017 | Kamemura | H01R 13/74 |
| 9,831,594 | B2 * | 11/2017 | Kurita | H01R 13/5213 |
| 2012/0322302 | A1 * | 12/2012 | Mori | B60L 53/16 439/573 |
| 2013/0249486 | A1 * | 9/2013 | Eberle | B60L 53/16 320/109 |
| 2015/0364877 | A1 | 12/2015 | Osawa | |
| 2018/0226627 | A1 * | 8/2018 | Shiohama | H01R 11/283 |

FOREIGN PATENT DOCUMENTS

JP  2016-1522  1/2016

\* cited by examiner

*Primary Examiner* — Briggitte R. Hammond
(74) *Attorney, Agent, or Firm* — Gerald E. Hespos; Michael J. Porco; Matthew T. Hespos

(57) ABSTRACT

It is aimed to provide a charging inlet easily mountable on a body of a vehicle. A charging inlet is fixed to a vehicle body (10) and includes a housing main body (30) having a plurality of terminals accommodated inside, a mounting plate provided on an outer peripheral surface of the housing main body and arranged on an inner surface side of the vehicle body (10), bolts (50) inserted into first through holes formed in the mounting plate and second through holes formed in the vehicle body (10), and nuts (60) provided on an outer surface side of the vehicle body (10) and threadably engaged with the bolts (50).

2 Claims, 4 Drawing Sheets

CHARGING INLET

BACKGROUND

Field of the Invention

This disclosure relates to a charging inlet.

Related Art

Plug-in vehicles capable of charging a battery with power from an external power supply have attracted attention in recent years. A plug-in vehicle includes a charging inlet provided on an outer surface of the vehicle. The charging inlet is connectable to a charging plug provided outside.

The charging inlet includes an inlet housing, a connector fitting portion, power terminals and communication terminals.

The inlet housing includes a mounting plate, a tubular portion formed on the front surface of the mounting plate and an annular fitting wall formed on the back surface of the mounting plate. The mounting plate is formed with bolt holes along an outer periphery thereof.

The tubular portion projects out of the vehicle from the front surface of the mounting plate. Additionally, the tubular portion is hollow and is formed with a through hole. The through hole is extends from a tip part of the tubular portion to the back surface of the mounting plate through the inside of the tubular portion and the mounting plate.

The connector fitting portion is in the form of a column an is inserted into the through hole of the tubular portion. A tip part of the connector fitting portion is located in the tubular portion, and a rear end part of the connector fitting portion projects inwardly of the vehicle from the back surface of the mounting plate.

The connector fitting portion is formed with terminal insertion holes. Each terminal insertion hole extends from the tip part of the connector fitting portion to the rear end of the connector fitting portion through the inside of the connector fitting portion.

Charging terminals and the signal terminals are inserted into the terminal insertion holes. Connection cables are connected to the rear end part of the connector fitting portion. Specifically, the connection cables include charging cables connected to the charging terminals and a signal wiring connected to the signal terminals.

The fitting wall formed on the back surface of the inlet housing surrounds the connector fitting portion.

The charging inlet configured as described above is fixed to a body of the vehicle. Specifically, the mounting plate is arranged on an outer surface of the body and is fixed to the body by bolts inserted into the bolt holes.

The body of the vehicle is formed with an insertion hole, and the fitting wall formed on the back surface of the mounting plate is inserted into the insertion hole. Inside the body, the cables and the signal wiring are connected to the power terminals and the signal terminals.

Japanese Unexamined Patent Publication No. 2016-0015222 discloses an example of such a charging inlet.

In mounting the charging inlet configured as described above on the vehicle, the charging inlet is fixed to the body of the vehicle after the connection cables are attached to the charging inlet.

In fixing the charging inlet to the body, the connection cables are first inserted into the insertion hole of the body. Then, the fitting wall of the charging inlet is fit into the insertion hole. Thereafter, the bolts are inserted into the bolt holes of the mounting plate and the mounting plate is fixed to the outer surface of the body.

In the process of fixing the charging inlet to the body in this way, a step of inserting the connection cables requires time and effort.

The present disclosure was developed in view of the above problem and an object thereof is to provide a charging inlet that is easily mountable on a body of a vehicle.

SUMMARY

A charging inlet according to the present disclosure is fixed to a vehicle body and includes a housing main body having terminals accommodated inside. A mounting plate is provided on an outer peripheral surface of the housing main body and is arranged on an inner surface side of the vehicle body. A bolt is inserted into a first through hole formed in the mounting plate and a second through hole formed in the vehicle body. A nut is provided on an outer surface of the vehicle body and is engaged threadedly with the bolt. According to this configuration, in fixing the charging inlet to the vehicle body, the bolt is inserted into each through hole from the inside of the vehicle and fixed with the nut from the outside of the vehicle body. Thus, the charging inlet can be fixed easily to the vehicle body even if connection cables or the like are connected to the charging inlet.

DETAILED DESCRIPTION

A charging inlet according to an embodiment is illustrated in FIGS. 1 to 5 where the same or substantially same components are denoted by the same reference signs. Not that, the components described below may be followed by the components as claimed written in parenthesis.

Figure 1:
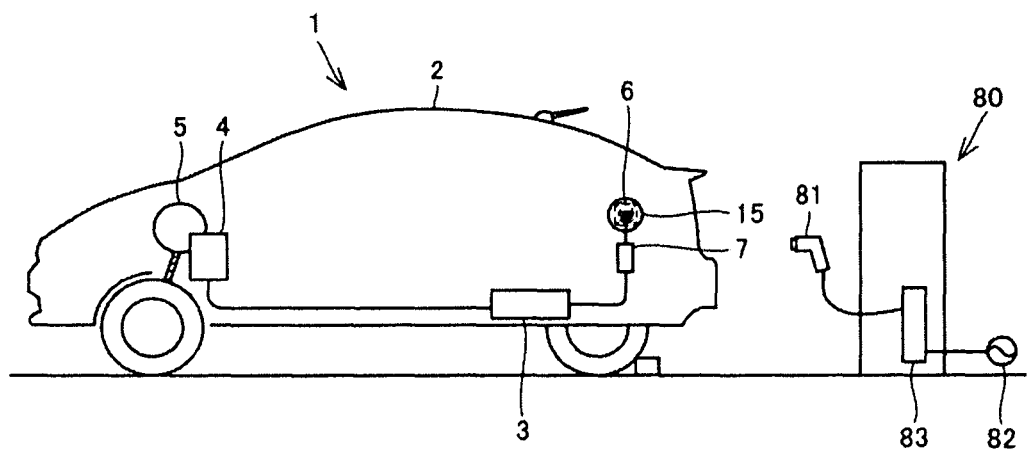
FIG. 1 is a diagram schematically showing a vehicle 1.

FIG. 1 is a diagram schematically showing a vehicle 1. The vehicle 1 includes a body 2, a battery 3, a PCU 4, a motor generator 5, a charging inlet 6 and a charger 7.

The battery 3 is a secondary battery and, for example, a lithium ion battery. The PCU 4 includes an inverter and a converter. The PCU 4 converts direct-current power supplied from the battery 3 into alternating-current power and supplies the converted power to the motor generator 5. The motor generator 5 is driven by the alternating-current power supplied from the PCU 4 to drive drive wheels.

The body 2 includes an inner body and outer panel components. The inner body is, for example, a monocoque body. The outer panel components include a rear fender component, a front fender component, etc.

The rear fender component is provided with a lid 15 that can be opened to expose the charging inlet 6 to the outside.

The charger 7 is connected to the charging inlet 6 and the battery 3. For example, the charger 7 converts alternating-current power supplied from the charging inlet 6 into direct-current power and supplies the converted power to the battery 3.

The charging inlet 6 is configured to connect to a charging gun 81 provided in a charging station 80. The charging station 80 includes the charging gun 81 and a converter 83. The converter 83 is connected to an external power supply 82 and supplies the alternating-current power supplied from the external power supply 82 to the battery 3 while adjusting at least one of a frequency, a current and a voltage of the alternating-current power.

Figure 2:
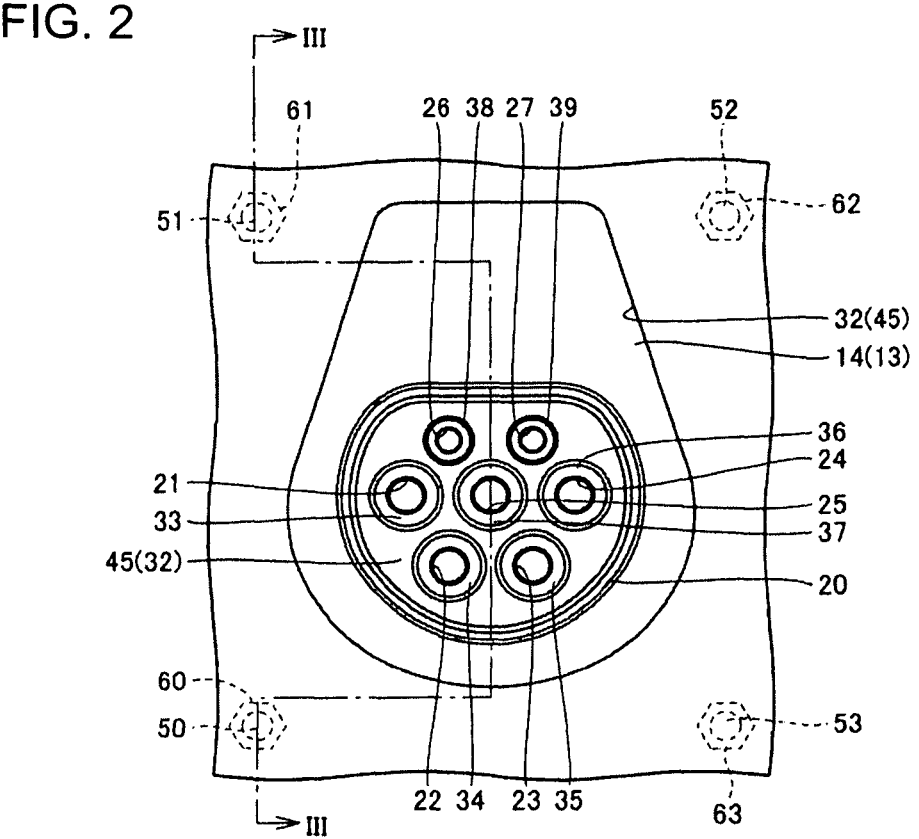
FIG. 2 is a plan view showing a charging inlet 6 in an open state.
Figure 3:
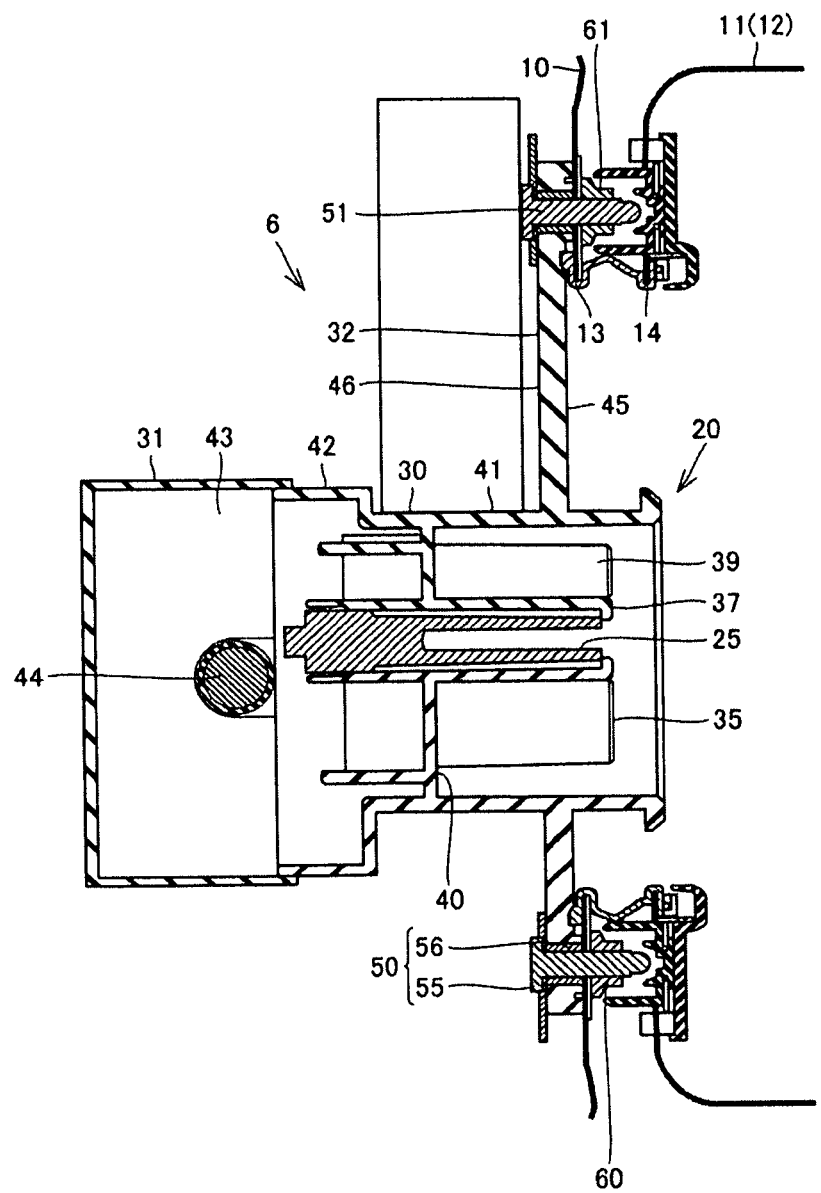
FIG. 3 is a section along of FIG. 2.

FIG. 2 is a plan view showing the charging inlet 6 in an open state. FIG. 3 is a section along of FIG. 2.

The body 2 includes an inner body 10 and a rear fender component 12, as shown in FIGS. 2 and 3. Note that the rear fender component 12 is one type of an outer panel component 11 and is mounted on an outer surface of the inner body 10.

The inner body 10 is formed with an opening 13, and the rear fender component 12 also is formed with an opening 14. Note that the rear fender component 12 is provided with the lid 15 shown in FIG. 1. The openings 13 and 14 have substantially the same shape.

As shown in FIG. 2, the charging inlet 6 includes a housing 20, alternating-current power terminals 21, 22 and 23, a mid-point terminal 24, a ground terminal 25, a connection confirmation terminal 26 and a communication terminal 27.

The housing 20 includes a main body 30, a cover 31 and a mounting plate 32, as shown in FIG. 3. The housing 20 also includes tubular portions 33, 34, 35, 36, 37, 38 and 39, as shown in FIG. 2. The main body 30 is hollow and includes a partition plate 40, a front tubular portion 41 and a rear tubular portion 42. The partition plate 40 is provided inside the main body 30. The front tubular portion 41 is on a more outer side of the vehicle than the partition plate 40 and the rear tubular portion 42 is on a more inner side of the vehicle than the partition plate 40. The tubular portions 33, 34, 35, 36, 37, 38 and 39 penetrate through the partition plate 40 and are hollow.

The alternating-current power terminals 21, 22 and 23 are provided in the tubular portions 33, 34 and 35. The mid-point terminal 24 is provided in the tubular portion 36, and the ground terminal 25 is provided in the tubular portion 37. The connection confirmation terminal 26 is provided in the tubular portion 38, and the communication terminal 27 is provided in the tubular portion 39.

Figure 4:
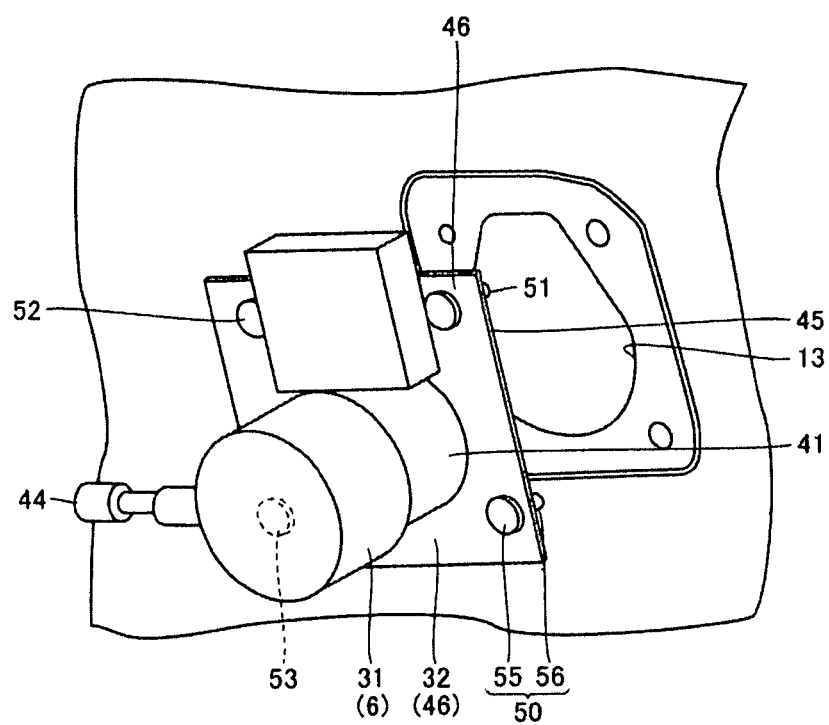
FIG. 4 is an exploded perspective view showing the charging inlet 6 viewed from the inside of the vehicle.

The cover 31 is provided to close an opening on a vehicle inner side of the rear tubular portion 42. A connection space 43 is formed by the cover 31, the rear tubular portion 42 and the partition plate 40. FIG. 4 is an exploded perspective view showing the charging inlet 6 viewed from the inside of the vehicle. A charging cable 44 is inserted into the connection space 43 shown in FIG. 3 and is connected electrically connected to the terminals such as the alternating-current power terminals 21, 22 and 23.

The mounting plate 32 is provided on the outer peripheral surface of the front tubular portion 41, and protrudes out from the outer peripheral surface of the front tubular portion 41.

The mounting plate 32 is in the form of a plate and has principal surfaces 45 and 46. The principal surface 45 is located on a vehicle outer side, and the principal surface 46 is located on a vehicle inner side. Through holes are formed in four corners of the mounting plate 32, and bolts 50, 51, 52 and 53 are inserted into the respective through holes. Each bolt 50 includes a head 55 and a shaft 56.

In FIG. 3, the head 55 is arranged on the side of the principal surface 46 and the shaft 56 projects from the principal surface 45 through the through hole and is inserted into a through hole formed in the inner body 10.

Figure 5:
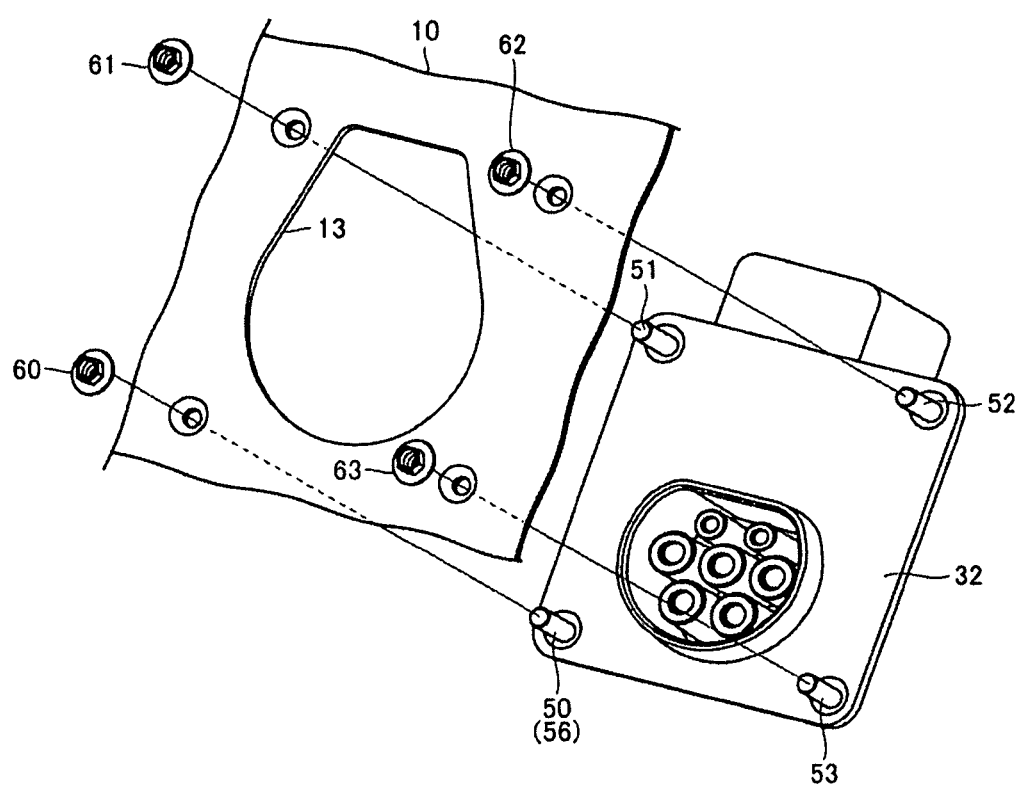
FIG. 5 is an exploded perspective view showing the charging inlet 6 and a configuration around the charging inlet 6.

A nut 60 is engaged threadedly with a tip of the shaft 56 and is arranged on an outer surface of the inner body 10. FIG. 5 is an exploded perspective view showing the charging inlet 6 and a configuration around the charging inlet 6. Also, the bolts 51, 52 and 53, nuts 61, 62 and 63 similarly are engaged threadedly with tips of shafts of the bolts 51, 52 and 53. Threadedly engaging the nuts 60, 61, 62 and 63 with the respective bolts 50, 51, 52 and 53 in this way fixes the mounting plate 32 and the charging inlet 6 to the inner body 10.

As shown in FIG. 3, the outer panel component 11 is mounted on the inner body 10. As shown in FIG. 2, the principal surface 45 of the mounting plate 32 and the tubular portions 33 to 39 are exposed through the openings 13 and 14.

The battery 3 is charged using the above-described charging inlet 6 by first opening the lid 15 in FIG. 1 to expose the charging inlet 6. Subsequently, the charging gun 81 is connected to the charging inlet 6 shown in FIG. 2. The charging gun 81 also is provided with terminals corresponding to the terminals, such as the alternating-current power terminals 21, 22 and 23 of the charging inlet 6. Thus, the terminals of the charging inlet 6 and the respective terminals in the charging gun 81 are connected electrically.

A mounting operation of mounting the charging inlet 6 configured as described above on the vehicle 1 is described with reference to FIG. 4. In fixing the charging inlet 6 to the inner body 10, the charging inlet 6 connected to the charging cable 44 is first prepared.

Subsequently, the mounting plate 32 of the charging inlet 6 is pressed against the inner surface of the inner body 10 from the inside the inner body 10. Thereafter, the charging inlet 6 is fixed to the inner surface of the inner body 10 using the bolts 50, 51, 52 and 53 and the nuts 60, 61, 62 and 63.

If an attempt is made to mount the charging inlet 6 connected to the charging cable 44 on the outer surface side of the inner body 10, the charging cable 44 first needs to be inserted into the opening 13.

The charging cable 44 is a long, and an operation of passing the charging cable 44 through the opening 13 takes time and effect. Further, the charging cable 44 may contact an edge of the opening 13 when being inserted into the opening 13, and an insulation coating formed on the surface of the charging cable 44 may be damaged.

On the other hand, the above problems can be suppressed according to the charging inlet 6 of this embodiment. The embodiment disclosed should be considered illustrative, but not restrictive in all aspects. The scope of the invention is defined by appended claims and intended to include all changes within the scope of claims and within the meaning and scope of equivalents.

LIST OF REFERENCE SIGNS 1 vehicle,
2 body,
3 battery,
5 motor generator,
6 charging inlet,
7 charger,
10 inner body,
11 outer panel component,
12 rear fender component,
13, 14 opening,
15 lid, 20 housing,
21, 22, 23 power terminal,
24 mid-point terminal,
25 ground terminal,
26 connection confirmation terminal,
27 communication terminal,
30 main body,
31 cover,
32 mounting plate,
33, 34, 35, 36, 37, 38, 39 tubular portion,
40 partition plate,
41 front tubular portion,
42 rear tubular portion,
43 connection space,
44 charging cable,
45, 46 principal surface,
50, 51, 52, 53 bolt,
55 head portion,
56 shaft,
60, 61, 62, 63 nut,
80 charging station,
81 charging gun,
82 external power supply,
83 converter

What is claimed is:

1. A charging inlet fixed to a vehicle body, the vehicle body having an outer surface facing outward on the vehicle body, an inner surface facing inward on the vehicle body, an opening formed through the vehicle body from the inner surface to the outer surface, and at least one body through hole formed through the vehicle body at a position offset from the opening, the charging inlet comprising:

a housing main body having opposite inner and outer ends, the inner end of the housing main body being inward of the vehicle body, the outer end of the housing main body projecting through the opening in the vehicle body to a position outward of the outer surface of the vehicle body, a plurality of terminals accommodated inside the housing main body;

a mounting plate provided on an outer peripheral surface of the housing main body, the mounting plate being arranged on the inner surface of the vehicle body, at least one plate through hole formed through the mounting plate at a position aligned with the body through hole;

at least one bolt inserted through the plate through hole formed in the mounting plate and through the body through hole formed in the vehicle body; and at least one nut provided on an outer surface side of the vehicle body, the at least one nut being threadedly engaged with the at least one bolt.

2. A vehicle, comprising:

a vehicle body having an outer surface facing outward on the vehicle body and an inner surface facing inward on the vehicle body, an opening formed through the vehicle body from the inner surface to the outer surface, and at least one body through hole formed through the vehicle body at a position offset from the opening;

a charging inlet having:

a housing main body having opposite inner and outer ends, the inner end of the housing main body being inward of the vehicle body, the outer end of the housing main body projecting through the opening in the vehicle body to a position outward of the outer surface of the vehicle body, a plurality of terminals accommodated inside the housing main body; and a mounting plate provided on an outer peripheral surface of the housing main body, the mounting plate being arranged on the inner surface of the vehicle body, at least one plate through hole formed through the mounting plate at a position aligned with the body through hole;

at least one bolt inserted through the plate through hole formed in the mounting plate and through the body through hole formed in the vehicle body; and at least one nut provided on an outer surface side of the vehicle body, the at least one nut being threadedly engaged with the at least one bolt.

\* \* \* \* \*